(12) United States Patent
Moore

(10) Patent No.: US 6,688,586 B1
(45) Date of Patent: Feb. 10, 2004

(54) INTEGRAL TRANSVERSE SPRING-AXLE

(76) Inventor: James Moore, 420 W. Oakwood Rd., Oxford, MI (US) 48371

( * ) Notice: Subject to any disclaimer, the term of this patent is extended or adjusted under 35 U.S.C. 154(b) by 0 days.

(21) Appl. No.: 10/245,186

(22) Filed: Sep. 16, 2002

Related U.S. Application Data
(60) Provisional application No. 60/322,788, filed on Sep. 17, 2001.

(51) Int. Cl.[7] .............................. B60G 11/02; F16F 1/18
(52) U.S. Cl. ............... 267/47; 267/7; 267/230; 267/37.3; 267/41; 280/124.171
(58) Field of Search .................. 267/7, 183, 184, 267/192, 193, 229, 230, 244, 245, 246, 247, 36.1, 37.3, 38, 39, 47, 158, 163, 164, 165, 6, 228, 25, 27, 41, 52, 260; 280/124.14, 124.171, 124.174

(56) References Cited

U.S. PATENT DOCUMENTS

| | | | | |
|---|---|---|---|---|
| 231,278 A | * | 8/1880 | Corban | 267/47 |
| 251,037 A | * | 12/1881 | Fromm | 267/7 |
| 377,666 A | * | 2/1888 | Booth | 280/124.12 |
| 378,180 A | * | 2/1888 | Shubert | 267/38 |
| 416,669 A | * | 12/1889 | Deniger | 267/47 |
| 915,337 A | * | 3/1909 | Emley | 267/38 |
| 3,671,997 A | * | 6/1972 | Sigmund | 16/93 R |
| 3,801,088 A | * | 4/1974 | Piepers et al. | 267/164 |
| 4,770,465 A | * | 9/1988 | Wiers | 297/375 |
| 4,887,841 A | * | 12/1989 | Cowburn et al. | 280/124.109 |
| 5,039,071 A | * | 8/1991 | Irle et al. | 267/52 |
| 5,094,434 A | * | 3/1992 | Ryu | 267/158 |

* cited by examiner

*Primary Examiner*—Jack Lavinder
*Assistant Examiner*—Devon Kramer
(74) *Attorney, Agent, or Firm*—Young & Basile, PC

(57) ABSTRACT

An integral transverse spring-axle combines the functions of both an axle and a suspension by locating the wheels laterally and longitudinally, in the manner of an axle, and allowing vertical displacements of the wheels, in the manner of a suspension. This is achieved with a leaf spring with a center portion, a pair of center leaves and at least one pair of side leaves both extending oppositely from the center portion. The outboard ends of the leaves attach to the wheel hub carriers/knuckles. The inboard center portion of the spring attaches to the chassis/body frame. The two opposite outboard ends of the spring-axle leaves can move independently of each other. The spring-axle can be of the steered or nonsteered type, and of the driven or non-driven type.

16 Claims, 4 Drawing Sheets

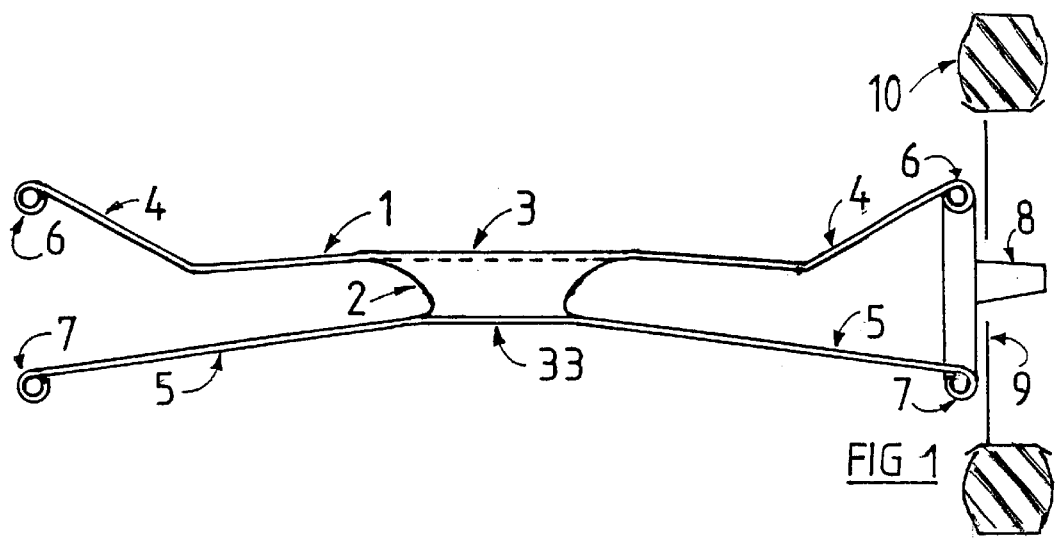
FIG 1
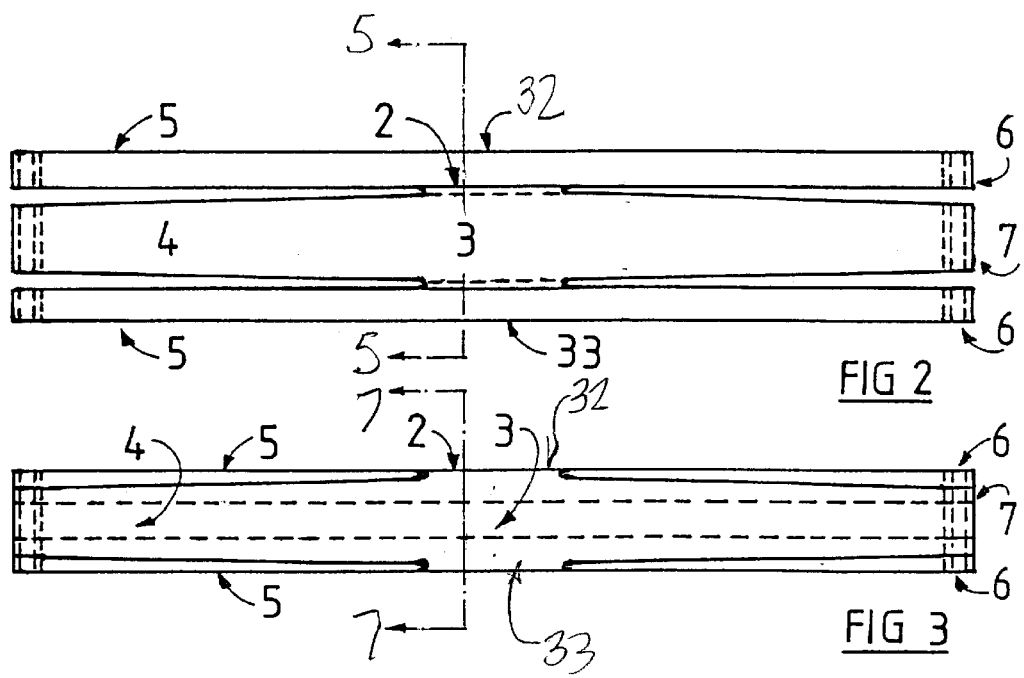
FIG 2
FIG 3

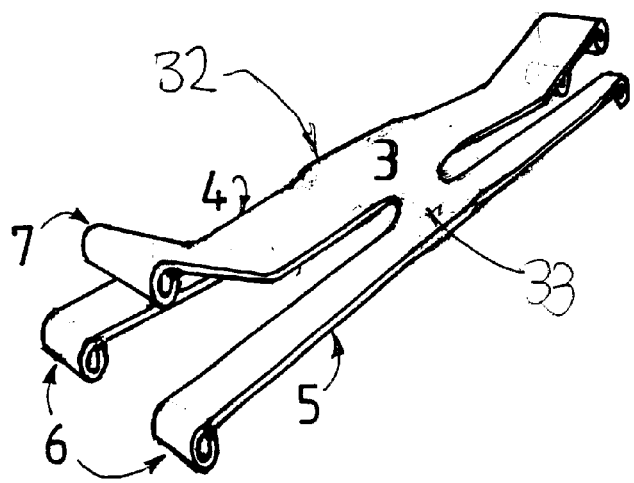
FIG 8
FIG 9
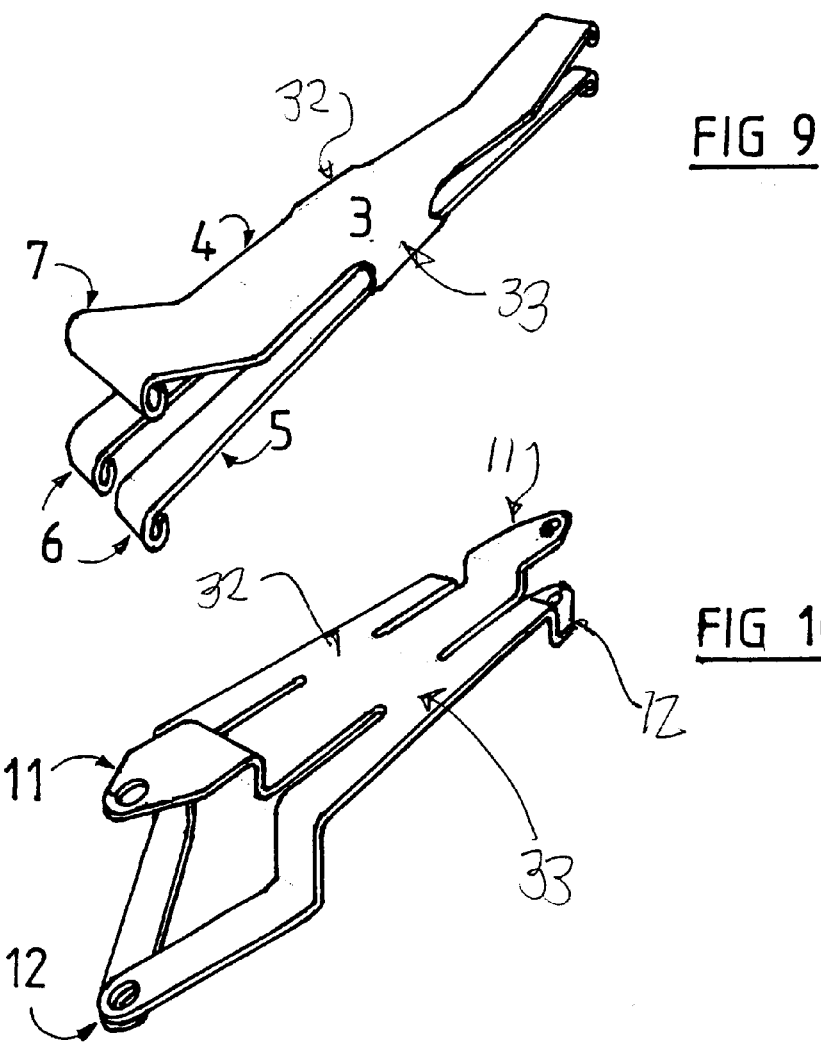
FIG 10

INTEGRAL TRANSVERSE SPRING-AXLE

CROSS REFERENCE TO CO-PENDING APPLICATION

This application claims the benefit of the priority filing date of U.S. Provisional patent application Ser. No. 60/322,788, filed Sep. 17, 2001, the entire contents of which are incorporated herein by reference.

BACKGROUND

The present invention relates to axles and suspensions.

The basic requirement for an axle is to maintain the road wheels in a predetermined position, or range of positions, relative to the rest of the vehicle. Axles can be of a simple beam design, dating back to at least the Roman chariot and still the most common type of axle today, to complex designs containing dozens of moving parts as may be found on modern luxury cars.

The basic requirement of a suspension is to isolate the driver and passengers from bumps and vibrations, caused by imperfect road surfaces, while also reducing mechanical stresses in the vehicle.

Ever since motorized transport evolved, with higher speeds creating increasing difficulties in the control, comfort and durability of vehicles, there has been constant development in the field of axles and suspensions. This has led to axles and suspensions of increased complexity. Although there have been significant developments in strain energy storage efficiency, such as the coil and parabolic leaf springs, generally speaking the more successful the axle/suspension is in meeting these requirements of control, comfort and durability, the more complex, heavy and voluminous it has become.

SUMMARY

To achieve the requirements of an axle/suspension it is necessary to have a flexible component between the wheels and the chassis/frame of the vehicle. This stores the energy transferring from the wheel during a road irregularity and returns it to the wheel a fraction of a second later, the minimum acceleration having been imparted to the chassis/frame.

This invention integrates the energy storage function into the axle itself such that one component functions as both an axle (locating the wheels) and a spring (storing the energy). It does so by using a leaf spring of a unique design. This leaf spring features a cross section that not only varies in cross sectional area, shape and modulus but, in its simplest form, also has a homogeneously formed center section. This complex center section may be formed homogeneously or from several pieces depending on the manufacturing economics of a particular application.

In one aspect of the invention, a vehicle spring-axle apparatus is disclosed for resiliently attaching wheels to a vehicle. The apparatus includes a unitary body having a center portion, first and second center leaves extending oppositely from the center portion, at least one pair of side leaves extending oppositely from the center portion, and means, carried on the ends of the center leaves and the side leaves, for connecting the pair of side leaves and the first and second center leaves to vehicle wheels.

The individual leaves, which connect the wheel hub carriers/knuckles to the frame, may be unequal in length to each other in order to provide wheel camber control, and may be different in cross section or width relative to each other in order to provide different stiffness or spring rate to each other. More then one load/deflection ratio (usually referred to as multiple spring rates) can be derived by differentially pre-tensioning the individual leaf fingers. This is achieved by forming the shape of the leaves in the free condition to be different to the shape of leaves when they are in the installed condition. The different stiffness between the individual leaf fingers gives greater design freedom when providing multiple spring rates. The purpose of multiple spring rates is to provide a soft (low natural frequency) suspension when the vehicle is lightly loaded which becomes stiffer when the vehicle is more fully loaded, without reducing carrying capacity or durability. The spring-axle is capable of providing multiple rates without any additional components to the leaf fingers.

The present spring-axle has one or more of the following features:

1. The spring-axle performs the function of an axle and a suspension using an integral mechanism,
2. The spring-axle uses a minimal number of components to function as a spring-axle,
3. The spring-axle can provide more than one spring rate without additional components,
4. The spring-axle can allow independent movement of wheels mounted to it, positioned on opposite sides of the vehicle, and
5. The spring-axle is adaptable for use on cars, vans, sports utility vehicles, pickup trucks, buses, heavy commercial vehicles, also light or recreational trailers and semi and drawbar commercial trailers.

BRIEF DESCRIPTION OF THE DRAWING

The various features, advantages, and other uses of the present invention have become more apparent by referring to the following details description and drawings in which:

FIG. 1 is a rear elevation of one aspect of a spring axle according to the present invention;

FIG. 2 is a plan view of one aspect of the spring axle of FIG. 1;

FIG. 3 is a plan view of another aspect of the spring axle of the present invention;

FIG. 8 is a perspective view of the aspect of the spring axle shown in FIG. 2;

FIG. 9 is a perspective view of the alternative spring axle of FIG. 3;

FIG. 10 is a perspective view of another aspect suitable for ball joint connections to a hub carrier/knuckle;

DETAILED DESCRIPTION

Figure 4:
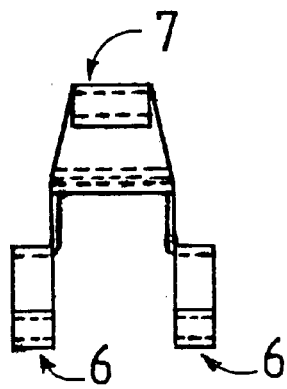
FIG. 4 is a side elevation of the spring axle shown in FIG. 2.

While the invention will be described in connection with what is presently considered to be the most practical and preferred aspect, it is to be understood that the invention is not to be limited to the disclosed aspects but, on the contrary, is intended to cover various modifications and equivalent arrangements used singly or in any combination.

The surfaces of the spring axles shown oriented to the top of each drawing are not necessarily the upper surfaces of the spring axles in their deployed position on a vehicle.

None of the surfaces are necessarily plane. The surfaces may be irregular or formulated. None of the edges are necessarily straight. The edges may be irregular or formulated.

The upper surfaces suggested by the drawing, that is the surfaces closest to the top of each drawing, are not necessarily the upper surfaces in the installed position.

FIG. 1 shows a flexible beam 1 connecting to hub carriers/knuckles 8 to form a complete axle. The beam 1 is the only component laterally locating the vehicle wheels 9 and tires 10 which also stores the strain energy created by wheel movement. The beam 1 acts as both axle and suspension and is referred to as a spring-axle. In one aspect, the spring axle 1 is a single homogeneous component formed from a single sheet of high strength material. High tensile spring steel is the anticipated material but composites, such as carbon or glass fiber, etc., would be suitable for some applications. The flexible beam 1 could be simulated by assembly of a number of separate components and perform the essential functions of a springaxle. The number of parts in a facsimile would be dictated by manufacturing economics.

The outboard ends of leaf fingers 4 and 5 terminate in bush eyes 6 and 7, see FIGS. 1, 2, 4, 5 and 8, or in receptacles for ball joints 11 and 12, FIG. 10 or in other means of attaching hub carriers/knuckles. The two pairs of side leaves or leaf fingers 4 and the single pair of center leaf fingers or leaves may each be of different stiffness to each other. The distance between the bush eyes 6 and 7 may be different when attached to the hub carrier/knuckle than the distance between them in the free condition. When this is the case, the pre-tension required for assembly will create a differential in spring rate between the leaves 4 and 5 in addition to any imposed by their individual cross sections.

A center portion 3 of the spring axle 1 has a complex cross section resulting in high stiffness in this area making it suitable for attachment to the chassis/body frame. The spring axle 1 is not necessarily depicted with its upper surface oriented to the top of the drawing. The curved transition 2 between leaves 4 and 5 is utilized to differentiate the effective lengths of leaves 4 and 5 to both provide camber control and dual suspension rate.

As shown in FIGS. 2, 4, 5 and 8, portions 32 and 33 are formed so that leaves 5 and 4 do not overlap.

As shown in FIGS. 3, 6, 7 and 9, the portions 32 and 33 are formed so that leaves 5 and 4 do overlap.

FIG. 10 shows alternative aspects of forming the portions 32 and 33 and the arrangement of leaves 11 and 12 to accommodate other hub carrier/knuckle 8 attachments, such as ball joints.

Figure 5:
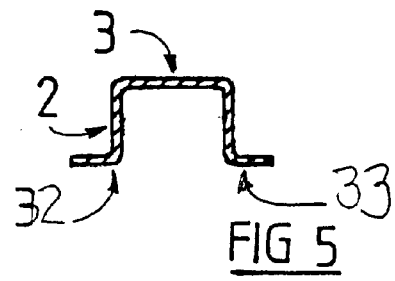
FIG. 5 is a cross sectional view along line 5—5 in FIG. 2.
Figure 6:
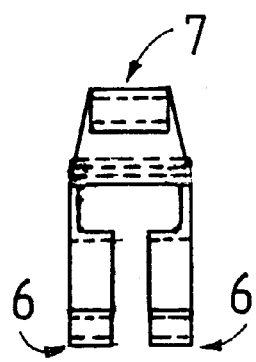
FIG. 6 is a side elevation of another aspect of the present spring axle.
Figure 7:
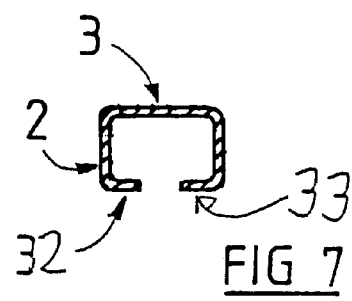
FIG. 7 is a cross sectional view along line 7—7 in FIG. 3.
Figure 11:
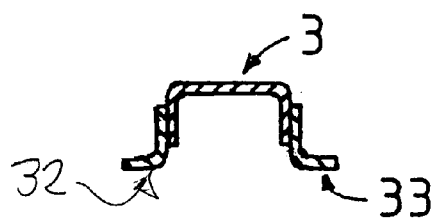
FIG. 11 is a cross sectional view along line 5—5, similar to FIG. 5, but showing the center section of multiple pieces.

FIG. 11 shows a cross section of the spring-axle 1 taken at the vehicle longitudinal center, similar to FIG. 5, but where the spring-axle 1 is built up from multiple pieces.

Figure 12:
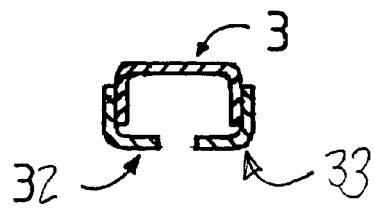
FIG. 12 is a cross sectional view along line 7—7, similar to FIG. 7, but showing another aspect of the center section built up from multiple pieces.

FIG. 12 shows a cross section of the spring-axle 1 taken at the vehicle longitudinal center, but again built up from multiple pieces.

Figure 13:
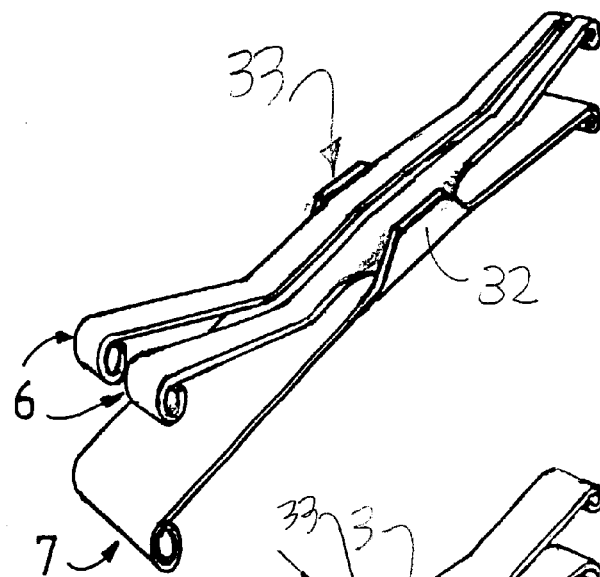
FIG. 13 is a bottom perspective view of an alternate spring axle, similar to FIG. 9, and showing the center section built up from multiple pieces.

FIG. 13 is a perspective view of a spring axle built up from multiple sections. Although this requires a greater number of parts, overall manufacturing economics may make this a preferred design. This spring-axle is shown inverted relative to FIG. 9. The function of the axle is the same whether made from a single part or multiple parts or in any combination.

Figure 14:
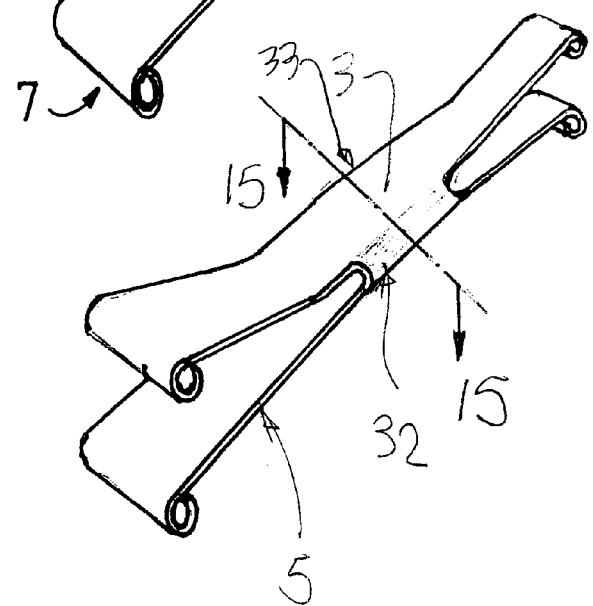
FIG. 14 is a perspective view of yet another alternate spring axle, similar to FIG. 9, but showing the side leaves as being formed of a single leaf.

In FIG. 14, the at least one side leaf extending oppositely from the center portion of the spring axle 1 is depicted as being formed of a single side leaf. It will be understood that this constructions of the pair of side leaves as being only a single leaf applies to all of the previously described aspects of the invention and any orientation of the spring axle 1.

Figure 15:
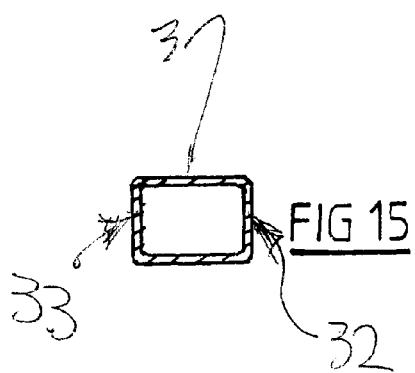
FIG. 15 is a cross-sectional view generally taken along line 15—15 in FIG. 14.

The center portion of the spring axle 1 shown in FIG. 14 may have a tubular cross-section as shown in FIG. 15. The tubular cross-section may be formed as an integral, one-piece member from tubular stock or a bent section wherein the ends of the tubular configuration abut each other. The abutting ends may be fixedly joined together, such as by welding, or other fastening techniques.

Figure 16:
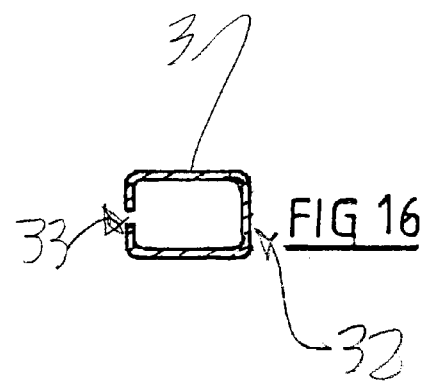
FIG. 16 is a alternate aspect, similar to FIG. 15, of the cross-section of the center portion of the spring axle of the present invention.

In FIG. 16, a cross-section for the center portion of the spring axle 1 shown in FIG. 14 is depicted in a manner similar to FIG. 15, but having spaced ends. This configuration readily lends itself to a bent sheet construction process.

What is claimed is:

1. A spring-axle apparatus for resiliently attaching wheels to a vehicle, the apparatus comprising:

a unitary member having a center portion;

first and second center leaves extending oppositely from the center portion and terminating in independently movable ends;

at least one pair of side leaves extending oppositely from the center portion and terminating in independently movable ends, the ends of the first and second center leaves each respectively spaced from the end of one of the at least one pair of side leaves;

means, carried between the ends of the center leaves and the pair of side leaves, for connecting the at least one pair of side leaves and the first and second center leaves to vehicle wheels.

2. The apparatus of claim 1 wherein:

the center portion is adapted for attachment to a vehicle.

3. The apparatus of claim 1 wherein:

the first and second center leaves, the pair of side leaves, and the center portion are formed as a unitary, one piece, homogeneous member.

4. The apparatus of claim 1 further comprising:

the at least one pair of side leaves includes first and second pairs of side leaves; and a width of the first and second center leaves is substantially completely disposed between innermost edges of the each pair of the first and second pairs of side leaves, respectively.

5. The apparatus of claim 1 further comprising:

the at least one pair of side leaves includes first and second pairs of side leaves; and a width of the first and second center leaves is substantially equal to a total width between outermost edges of the first and second pairs of side leaves.

6. The apparatus of claim 1 further comprising:

the at least one pair of side leaves includes first and second pairs of side leaves; and the side leaves in each of the first and second pairs of side leaves are parallel to each other.

7. The apparatus of claim 6 further comprising:

the at least one pair of side leaves includes first and second pairs of side leaves; and the first and second center leaves are being parallel to the first and second pairs of side leaves.

8. The apparatus of claim 1 further comprising:

the at least one pair of side leaves includes first and second pairs of side leaves; and ends of the first and second pairs of side leaves are overlapped.

9. The apparatus of claim 8 further comprising:

the at least one pair of side leaves includes first and second pairs of side leaves; and ends of the first and second pairs of side leaves are coaxial with the ends of the first and second center leaves.

10. A spring-axle apparatus for resiliently attaching wheels to a vehicle, the apparatus comprising:

a unitary member having a center portion;

first and second center leaves extending oppositely from the center portion;

at least one pair of side leaves, extending oppositely from the center portion; and means, carried on the ends of the center leaves and the at least one pair of side leaves, for connecting the at least one pair of side leaves and the first and second center leaves to vehicle wheels; and means for applying a pretension force to at least one of the first and second center leaves and to at least one of the pair of side leaves.

11. The apparatus of claim 10 wherein the pretension force applying means comprises:

the distance between the connecting means of the first and second center leaves and the connecting means for the pair of side leaves being different in a vehicle wheel connected state than in an unconnected state.

12. A spring-axle apparatus for resiliently attaching wheels to a vehicle, the apparatus comprising:

a unitary member having a center portion;

first and second center leaves extending oppositely from the center portion;

at least one pair of side leaves extending oppositely from the center portion;

means, carried on the ends of the center leaves and the at least one pair of side leaves, for connecting the at least one pair of side leaves and the first and second center leaves to vehicle wheels; and means for creating a different spring rate between the first and second center leaves and the at least one pair of side leaves.

13. A spring-axle apparatus for resiliently attaching wheels to a vehicle, the apparatus comprising:

a unitary member having a center portion;

first and second center leaves extending oppositely from the center portion;

at least one pair of side leaves, extending oppositely from the center portion;

the first and second center leaves and the at least one pair of side leaves having different stiffness; and means, carried on the ends of the center leaves and the at least one pair of side leaves, for connecting the at least one pair of side leaves and the first and second center leaves to vehicle wheels.

14. A spring-axle apparatus for resiliently attaching wheels to a vehicle, the apparatus comprising:

a unitary member having a center portion;

first and second center leaves extending oppositely from the center portion;

at least one pair of side leaves, extending oppositely from the center portion;

means, carried on the ends of the center leaves and the at least one pair of side leaves, for connecting the at least one pair of side leaves and the first and second center leaves to vehicle wheels; and the first and second center leaves a having a different length than the at least one pair of side leaves.

15. A spring-axle apparatus for resiliently attaching wheels to a vehicle, the apparatus comprising:

a unitary member having a center portion;

first and second center leaves extending oppositely from the center portion;

at least one pair of side leaves, extending oppositely from the center portion;

means, carried on the ends of the center leaves and the at least one pair of side leaves, for connecting the at least one pair of side leaves and the first and second center leaves to vehicle wheels; and an arcuate edge transition formed on the center portion between the first and second center leaves and the at least one pair of side leaves.

16. A spring-axle apparatus for resiliently attaching wheels to a vehicle, the apparatus comprising:

a unitary member having a center portion;

first and second center leaves extending oppositely from the center portion;

at least one pair of side leaves, extending oppositely from the center portion;

means, carried on the ends of the center leaves and the at least one pair of side leaves, for connecting the at least one pair of side leaves and the first and second center leaves to vehicle wheels;

the at least one pair of side leaves includes first and second pairs of side leaves; and a width of the first and second center leaves is wider than a space between innermost edges of the first and second pairs of side leaves.

* * * * *